Feb. 5, 1963  E. M. BROCKWAY  3,076,380
CONTOUR PROJECTOR OR THE LIKE WITH INTERNAL
FOCUSING AND OBJECT SCANNING MEANS
Filed March 28, 1960  2 Sheets-Sheet 1
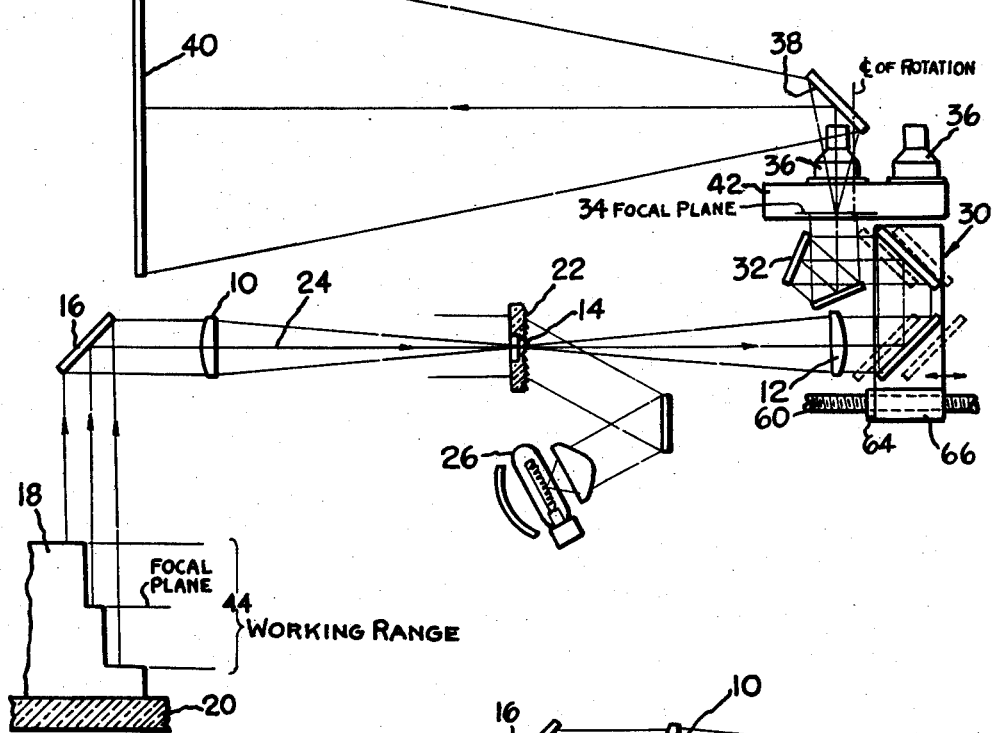
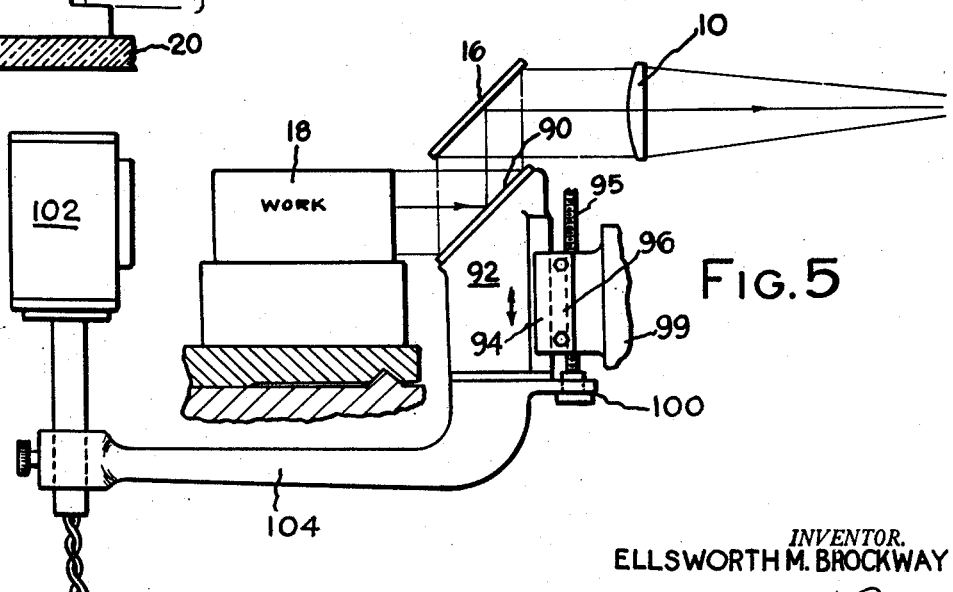
INVENTOR.
ELLSWORTH M. BROCKWAY
BY Frank C. Parker
Hoffman Stone
ATTORNEYS

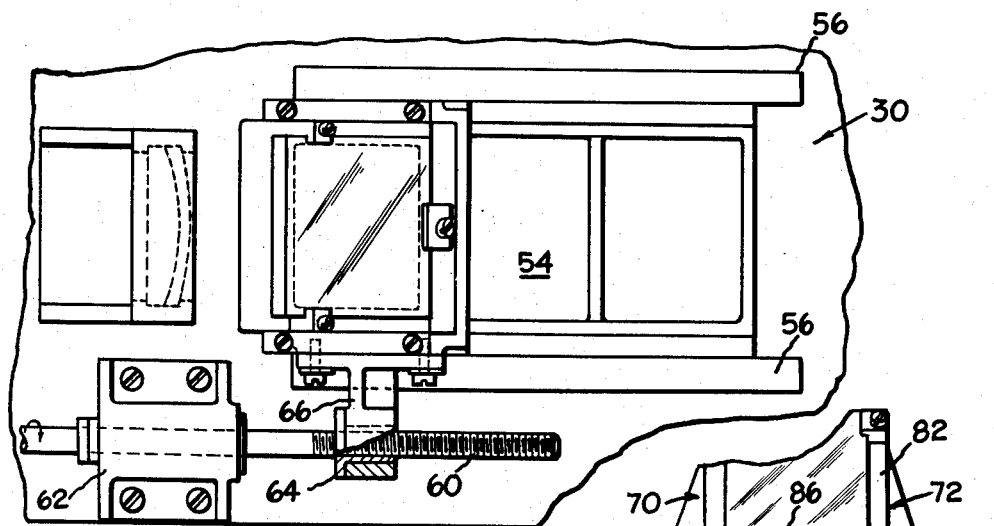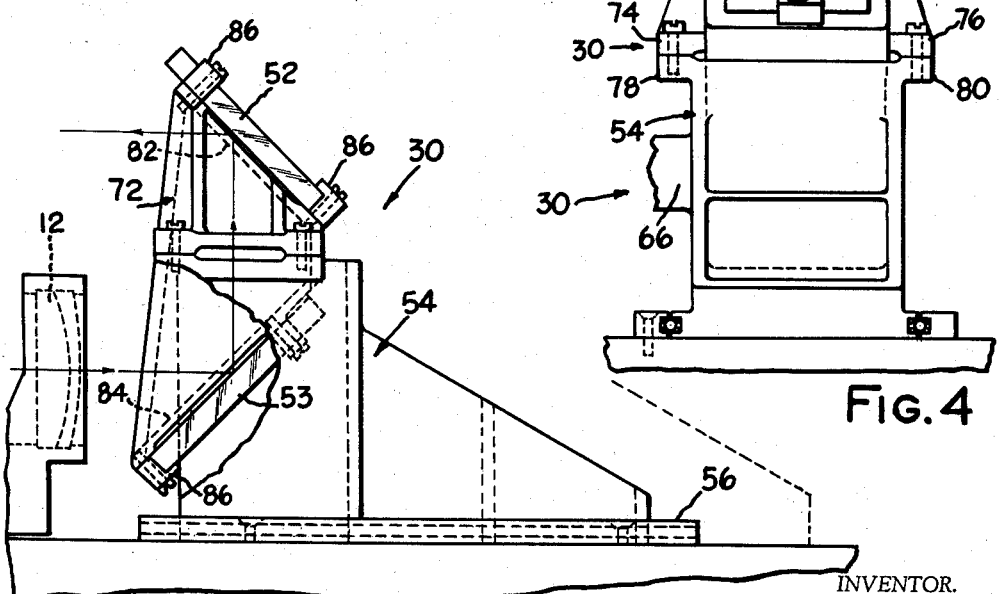

United States Patent Office 3,076,380
Patented Feb. 5, 1963

3,076,380
CONTOUR PROJECTOR OR THE LIKE WITH INTERNAL FOCUSING AND OBJECT SCANNING MEANS
Ellsworth M. Brockway, Rochester, N.Y., assignor to Bausch & Lomb Incorporated, a corporation of New York
Filed Mar. 28, 1960, Ser. No. 17,875
1 Claim. (Cl. 88—24)

This invention relates to an improved optical arrangement for a contour projector or the like, and more particularly to an improved optical positioning and internal focusing arrangement for a contour projector, which permits the use of a relatively simple and inexpensive stage for supporting and transporting the workpiece, and at the same time provides improved ease and convenience of operation.

Previous projection microscopes, or contour projectors as they are commonly called usually require the use of a relatively complicated and expensive movable stage for supporting the workpiece and successively positioning its various parts accurately in the focal plane and field of view of the projector. In order to achieve a relatively high accuracy in measurement work, the stage in the previous instruments must be mounted upon accurate, and therefore expensive cross slides and vertical ways, which must be made relatively rugged in order to support relatively heavy workpieces. In addition, relatively heavy and accurately calibrated drive mechanisms must be provided for driving the stage along the ways and the cross slides. The stage, therefore, often represents a major part of the cost of a contour projector.

Accordingly, one important object of the present invention is to provide an improved contour projector.

Other objects are: to provide a novel internal focusing arrangement in a contour projector, whereby focusing of the projected image of a workpiece may be accomplished without adjusting movement of the workpiece; to provide an improved contour projector in which, once the workpiece is placed upon the stage within a relatively large area working range, focusing of the projected image may be accomplished through movement of a relatively light weight internal component of the projector without affecting the size of the projected image and without adversely affecting the accuracy of measurement achievable by the instrument; to provide an improved optical system for a contour projector including means for adjusting the position of the optical axis of the projector relative to the body of the projector so that a workpiece mounted in front of the projector may be scanned without moving the workpiece; to provide an improved contour projector including means for adjusting the position of the front focal plane, and means for displacing the optical axis, so that accurately controllable travel of the stage need be provided for along only a single coordinate direction, thereby decreasing the cost and improving the accuracy and precision of the system, particularly where relatively heavy workpieces are involved; and in general to provide an improved contour projector, which is of relatively simple and rugged construction, easy to use, capable of relatively high precision measurement work, and long lasting in service.

The foregoing and other objects and advantages of the present invention will become apparent in the following detailed description of a representative embodiment thereof, taken in conjunction with the drawings, wherein:

FIG. 1 is a schematic diagram of the main optical system of a contour projector according to a preferred embodiment of the invention;

FIG. 2 is a side elevational view of an internal focusing carriage for use in the optical system shown in FIG. 1;

FIG. 3 is a plan view of the carriage shown in FIG. 2;

FIG. 4 is a rear view of the carriage shown in FIGS. 2 and 3; and,

FIG. 5 is a partly schematic, side elevational view of the arrangement for adjusting the position of the optical axis according to the invention.

The present invention is particularly applicable to optical systems of the type having a telecentric afocal relay system for producing an aerial image of the object to be viewed, which image may be viewed through an eyepiece, or magnified by a projection lens for display on a screen. According to the invention, means are provided for adjusting the optical distance between the afocal system and a predetermined image plane, thereby to bring the aerial image into focus in the predetermined plane without the necessity of moving the workpiece.

In the illustrated embodiment, the adjusting means takes the form of a pair of plano mirrors movably mounted in the optical path between the afocal system and the plane in which it is desired to focus the aerial image. The mirrors are arranged at right angles to each other, one of them being positioned to intercept the imaging rays emerging from the afocal system and to reflect the imaging rays to the second one, which then directs the imaging rays forwardly along a path spaced from the optical axis of the afocal system. The mirrors are movable in the direction of the optical axis of the afocal system for adjusting the length of the optical path between the rear element of the afocal system and the image plane.

One property of a telecentric afocal optical system is the ability of the system to maintain an image of an object in focus in a fixed focal plane while the system is moved as a unit all the way from contact with the object to contact with the image. Not only does such change in the relative position of the system with respect to the optical conjugates fail to defocus the image, but also, to at least a first approximation, has no effect on the aberrations (including those of the third order) nor on the effective aperture of the system. With such a system, therefore, in an optical viewing device such as a contour projector, the image may be brought to a preselected image plane by adjusting the length of the optical path between the object and the image plane, and the adjustment may be made by adjusting either the length of the path in front of the afocal system or the length of the path to the rear of the afocal system.

In previous contour projectors of the type having telecentric afocal systems such as, for example, the contour projector described in the Turner and Kingslake Patent No. 2,552,238, the distance between the afocal system and the image plane is fixed, and focusing is done by physically moving the workpiece into a fixed object plane. This arrangement requires the provision of a relatively heavy and expensive mechanism for moving the workpiece, since for most work, a sharply focused image is required. In accordance with the present invention, focusing is done by varying the length of that portion of the optical path behind the afocal system, that is, the length of the path between the afocal system and the image focal plane, which adjustment can be made by moving a relatively light weight and inexpensive optical element mounted within the instrument.

According to a further feature of the invention the stage of the contour projector may be further simplified by providing a pair of parallel reflecting surfaces in front of the projector for scanning the optical axis across a workpiece. One of the reflecting surfaces is fixed directly in front of the afocal system and inclined relative thereto. The second reflecting surface is movably mounted beneath or to one side of the first reflecting surface in confronting relationship thereto. Movement of the second reflecting surface effectively moves the viewing optical axis across the workpiece in the direction of the movement. Such motion also changes the length of the optical path between the afocal system and the workpiece, which change may be readily compensated for by adjusting the internal focusing element.

The arrangement including both the internal focusing and the scanning features achieves a high degree of versatility in a contour projector, or other instrument in which it is incorporated, without the need for cross slides or vertical ways for the stage. Relative motion between the optical system and the workpiece is provided along all three space coordinate directions even though the stage may be provided with only one set of ways.

Referring now to the drawing, and particularly to FIG. 1 thereof, the contour projector shown therein includes a telecentric afocal relay system having a front objective 10 and a rear objective 12. The objectives 10 and 12 are spaced apart a distance approximately equal to the sum of their focal lengths, and a stop 14 is positioned at their common focal point. As shown, the objectives 10 and 12 are of equal power and therefore provide unit magnification between the object and the aerial image formed by the afocal system. If desired, the objectives 10 and 12 may be of different respective powers to achieve either magnification or minification of the image size relative to the object. In the embodiment shown, a plane mirror 16 is positioned in front of the front objective 10 for vertical viewing of a workpiece 18, which is supported upon a stage 20 beneath the mirror 16.

In the illustrated embodiment, the stop 14 is defined by a central aperture (not separately designated) in a prismatic refracting element 22, which refracts light from an internal source 26 for vertical, or episcopic illumination of the workpiece. This arrangement, including the refracting element 22 is described and claimed in the copending application of Robert J. Meltzer, Ser. No. 10,790, filed February 24, 1960, and assigned to the present assignee.

The imaging rays emerging from the rear objective 12 of the afocal system are reflected by a dihedral corner reflector 30 to a penta-reflector 32 which directs them to the image focal plane 34. A magnifying objective, or projection lens 36 then relays the image formed at the focal plane 34 via an inclined first surface mirror 38 to the view screen 40. Any number of interchangeable objectives 36 having different respective powers may be provided for relaying the image to the view screen depending upon the range of magnification desired in the instrument. Two interchangeable objectives 36 are shown in the drawing for purposes of illustration. They may be mounted upon a turret 42 for selective insertion into the optical path of the system.

The workpiece 18 is placed upon the stage 20, which is preferably adjustable vertically in position so that the portion of the workpiece it is desired to view may be brought within the working range in which focus can be obtained, as indicated by the bracket 44. The vertical movement of the stage 20 may be coarse, and need not be smooth, nor subject to precise control. Focusing is then accomplished by moving the reflector 30 back or forth until a sharp image is obtained on the screen 40.

For maximum accuracy and ease of construction and adjustment, the reflector 30 is preferably constructed as shown in FIGS. 2, 3, and 4, the individual reflecting elements 52 and 53 being first surface mirrors rigidly fixed upon a movable carriage 54. The carriage 54 rides in ball bearing ways 56, and is drivable therealong by a screw and follower nut arrangement. The ways 56 are accurately aligned with the optical axis 24 (FIG. 1) of the afocal system so that the reflector 30 is maintained in accurate alignment at all positions through its travel along the ways. The drive screw 60 is rotatably supported in a bearing assembly 62 laterally offset from the carriage 54, and the follower nut 64 is fixed on an arm 66, which extends from the carriage. The screw 60 may be extended forwardly through the front panel (not shown) of the projector, and carry a crank or hand wheel (not shown) for manual manipulation, or alternatively, it may be motor driven.

The mirrors 52 and 53 are rigidly mounted in a separate sub-assembly (not separately designated) which is detachable as a unit from the main body of the carriage 54. The sub-assembly includes a pair of side plates 70 and 72, and the mirrors 52 and 53 are secured in top and bottom frames 82 and 84, which are brazed to and extend between the side plates 70 and 72. The mirrors 52 and 53 are secured against the outwardly facing surfaces of the frames 82 and 84 respectively by dogs 86. During assembly, the sub-assembly including the side plates 70 and 72, the frames 82 and 84 and the mirrors 52 and 53 may be set on an optical bench and the mirrors accurately positioned perpendicularly to each other by inserting shims or the like between the frames 82 and 84 and the mirrors. Horizontal flanges 74 and 76 project from the side plates 70 and 72, respectively for securing the sub-assembly to the main body of the carriage 54. The flanges 74 and 76 rest upon supporting flanges 78 and 80, which are fixed on the main body of the carriage. During assembly, shims (not shown) may be inserted between the flanges 74 and 78, and 76 and 80 for accurately positioning the mirror sub-assembly in the vertical sense in order to insure proper positioning of the optical axis with respect to the projection lens 36.

With the internal focusing arrangement so far described the stage 20 would normally be mounted upon a cross slide to permit traverse of the workpiece in both coordinate directions in a horizontal plane. Rough stepwise adjustment of the stage in the vertical direction is also desirable, but there is no need for smooth and accurately controllable vertical travel of the stage. It will be apparent that if the mirror 16 in front of the front objective 10 is removed, the projector may readily be arranged for horizontal, instead of vertical viewing, in which case the stage 20 would normally be provided with a horizontal way extending transversely with respect to the optical axis 24, and a vertical way. In this case, the cross slide may be omitted because there is no need for accurately controlled travel of the workpiece toward and away from the front objective 10, that is, in the direction of the optical axis 24. The internal focusing feature of the present invention is, accordingly, advantageous for use in either case, whether the projector is arranged for vertical or for horizontal viewing, since it permits the elimination of at least one set of ways for the stage 20. Precision travel of the stage need be provided in only two space coordinate directions.

The internal focusing arrangement also permits the achievement of fully utility of the contour projector using a stage having only one set of precision ways. This may be accomplished as illustrated in FIG. 5 by positioning a second mirror 90 parallel to and spaced from the front mirror 16 for re-directing the optical axis into a path parallel to but offset from the optical axis of the front objective 10. The auxiliary mirror 90 is mounted on a carriage 92, which rides on vertical ways 94 for smoothly guided vertical travel so that the displacement of the front optical axis of the projector may be controllably varied for scanning the workpiece 18 in a vertical direction. Any desired drive arrangement may be provided for controllably moving the carriage 92 along the ways 94. As shown, the drive includes a screw 95 threadedly engaged in a bracket 96 fixed to the projector housing 99. The ways 94 are secured to the bracket 96. The carriage 92 is supported by the screw 95 for vertical travel therewith, by a thrust bushing connection 100. When this arrangement is used, it is also desirable to mount the profile illumination lamp 102 on the carriage 92. An extension arm 104 may be used for this purpose, or any other desired arrangement.

Vertical travel of the mirror 90 changes the effective length of the optical path between the front objective 10 and the workpiece 18, thereby affecting the focus of the image at the image focal plane 34. In previous contour projectors, therefore, this type of scanning arrangement was not practicable. With the internal focusing arrangement of the present invention, any defocusing of the image occasioned by the optical scanning may be readily and quickly compensated for by moving the internal mirror assembly 30 to bring the image back into focus.

What is claimed is:

In a contour projector or the like, the combination of
a stationary telecentric afocal optical system which forms an aerial image of an object,
means for holding said object at a fixed distance from said afocal system within the focal working range thereof,
a pentaprism type of device located optically in a fixed position between the afocal system and said aerial image so as to direct the image rays in a direction crosswise to said system,
a projection screen,
means including an objective which is optically aligned between the device and screen for enlarging said image upon said screen, and
focusing means optically located between said system and said pentaprism device and including a dihedral corner reflector which faces said system and said device so as to operatively retrodirect the image rays which emerge from said system back toward said device, said reflector being mounted for movement along the axis of said system so that the front and rear conjugates of the system may be varied in their relative lengths whereby the plane of sharp focus in the object space may be moved along the optical axis relative to the stationary object.

References Cited in the file of this patent

UNITED STATES PATENTS

| | | |
|---|---|---|
| 715,793 | Harvey | Dec. 16, 1902 |
| 1,166,343 | Fielding | Dec. 28, 1915 |
| 1,486,231 | Cox | Mar. 11, 1924 |
| 2,478,555 | Yule | Aug. 9, 1949 |
| 2,552,238 | Turner et al. | May 8, 1951 |
| 2,552,280 | Hudak | May 8, 1951 |
| 2,674,917 | Summerhayes | Apr. 13, 1954 |
| 2,725,800 | Dewhurst | Dec. 6, 1955 |